Figure 1:
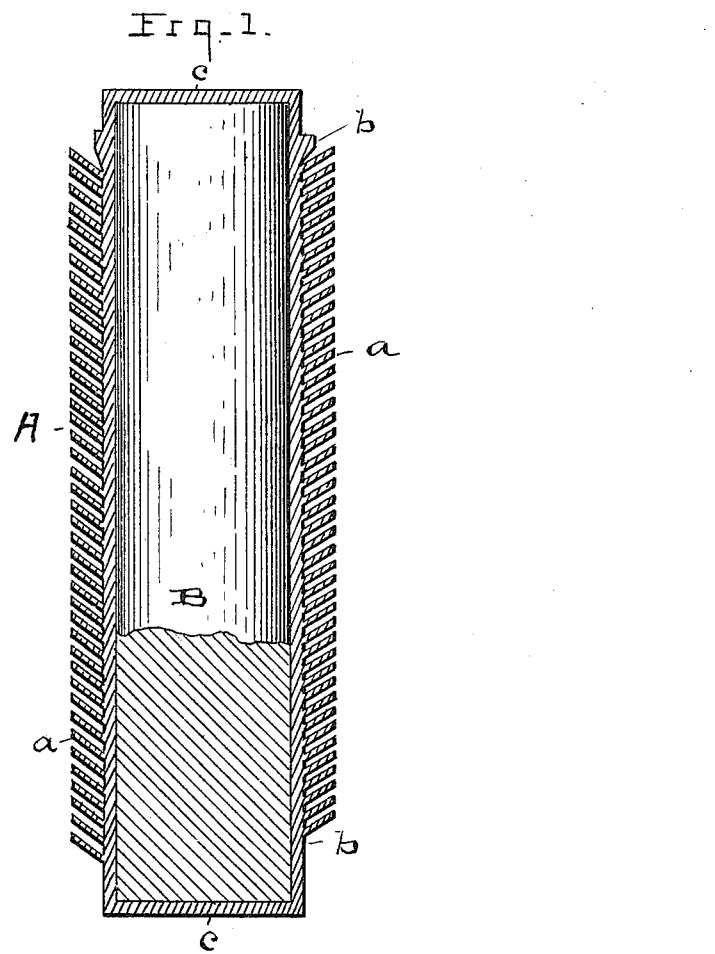

No. 617,004. Patented Jan. 3, 1899.
T. A. WILLARD.
STORAGE BATTERY ELECTRODE.
(Application filed Jan. 26, 1897.)

(No Model.) 2 Sheets—Sheet 1.

ATTEST
R. B. Moyer
H. E. Moodra

INVENTOR
Theodore A. Willard

By H. F. Fisher ATTY

No. 617,004. Patented Jan. 3, 1899.
T. A. WILLARD.
STORAGE BATTERY ELECTRODE.
(Application filed Jan. 26, 1897.)
(No Model.) 2 Sheets—Sheet 2.
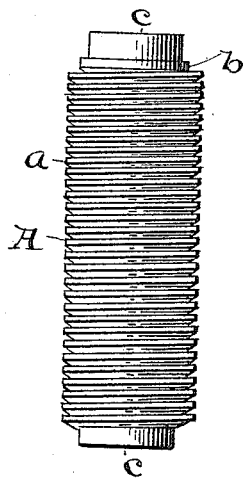
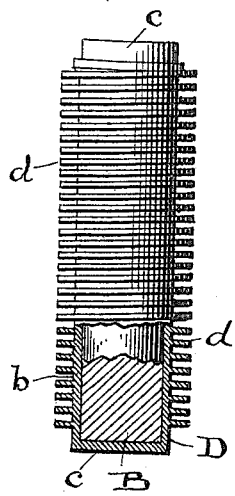 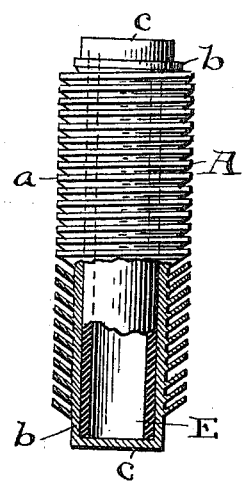
INVENTOR
Theadon A. Willard
By W. F. Fisher ATTY

UNITED STATES PATENT OFFICE.

THEADORE A. WILLARD, OF CLEVELAND, OHIO, ASSIGNOR, BY DIRECT AND MESNE ASSIGNMENTS, TO SIPE & SIGLER, OF SAME PLACE.

STORAGE-BATTERY ELECTRODE.

SPECIFICATION forming part of Letters Patent No. 617,004, dated January 3, 1899.

Application filed January 26, 1897. Serial No. 620,767. (No model.)

*To all whom it may concern:*

Be it known that I, THEADORE A. WILLARD, a citizen of the United States, residing at Cleveland, in the county of Cuyahoga and State of Ohio, have invented certain new and useful Improvements in Storage-Battery Electrodes; and I do hereby declare that the following is a full, clear, and exact description of the invention, which will enable others skilled in the art to which it appertains to make and use the same.

My invention relates to improvements in storage-battery electrodes; and one of the objects of the invention is to produce a stiff electrode, so that it cannot be buckled or warped out of shape by excessive charges and discharges, and whereby a battery is produced that can endure repeatedly short-circuiting without material injury.

A further object of the invention is to produce an electrode of extreme lightness as compared with its capacity, thus providing a battery which is adapted to what are known as "horseless carriages" and other horseless vehicles, as well as generally where a light and efficient portable battery is desired.

In the accompanying drawings, Figure 1 is a central sectional elevation longitudinally of one form of my new tubular electrode, the ends of which are hermetically sealed and containing a solid stiffening-core, as hereinafter fully described. Fig. 2 is a side elevation of a complete tubular electrode—say of the style shown in either Fig. 1 or Fig. 2. Fig. 3 is a side elevation of an electrode partly broken away at its bottom and side and disclosing a solid core and having its shelves or ledges at right angles to the surface of the electrode. Fig. 4 is an elevation of an electrode having inclined shelves or ledges and partly broken away in section at its side and bottom and disclosing a tubular strengthening-core.

In the several figures the electrode is tubular in form, being developed, primarily, from a plain lead or other equivalent or sufficient metallic tube or cylinder, and in Figs. 1, 2, and 4 is provided with a series or succession of shelf-like projections or ledges *a*, spaced regularly apart and inclined outward and upward from the body thereof. These shelves or projections may be formed in spiral convolution from end to end, or they may be separate and independent projections, as may be preferred. Said shelves can also be made so that they are practically at right angles to the surface of the electrode, if desired, as shown at *d* in electrode D, Fig. 3, but usually and preferably they are made with an inclination upward from the body, so as to more securely retain the active material between them, and for greater economy of production the said projections or shelves are preferably made in a continuous spiral.

The electrode A, Figs. 1, 2, and 4, has a hollow tubular body portion or stock *b*, from which the convolutions of shelves *a* have been developed, and the ends *c* of the body are closed and hermetically sealed to cut off all communication with the interior of the body, said closing being done with lead or a like material which will not be affected by acid, and thereby preventing attack upon the stiffening-core. Before this is done, however, I introduce a stiffener or core into said body, and the stiffener B (shown in Fig. 1) is a solid body or piece of suitable wood or other stiff material which fills the body *b* of the tube from end to end. However, if preferred, the stiffener may be a light steel tube E, as seen in Fig. 4, or said stiffening-tube may be of any other suitable material. I do not, therefore, confine myself to any special material or form of stiffener, as there are a large variety of materials and forms that could be used, and the stiffener can be solid, as shown in Figs. 1 and 3, or tubular, as in Fig. 4, or of any equivalent form.

The words "tubular" and "circular" as used herein are understood to mean substantially the same thing and are intended to cover electrodes which may be elliptical, oval, or otherwise circular in cross-section.

What I claim is—

1. The electrode substantially as described, having a succession of shelves or projections about its outside and a hollow body hermetically sealed at both ends, substantially as described.

2. An electrode for batteries having a succession of shelves one above the other upon its outside, and a hollow body closed across its ends to exclude liquid, and a stiffening-core of different material in said body within said ends, substantially as described.

Witness my hand to the foregoing specification this 15th day of January, 1897.

THEADORE A. WILLARD.

Witnesses:
H. T. FISHER,
R. B. MOSER.